United States Patent [19]

Bohanon

[11] 4,061,131

[45] Dec. 6, 1977

[54] HEAT TRANSFER SYSTEM PARTICULARLY APPLICABLE TO SOLAR HEATING INSTALLATIONS

[75] Inventor: Hoy R. Bohanon, Muskogee, Okla.

[73] Assignee: Acme Engineering and Manufacturing Corporation, Muskogee, Okla.

[21] Appl. No.: 634,898

[22] Filed: Nov. 24, 1975

[51] Int. Cl.² ............................................. F24J 3/02
[52] U.S. Cl. .................................. 126/271; 165/105; 237/1 A; 237/67
[58] Field of Search ................ 237/1 A, 67; 126/271; 165/105; 137/151, 206, 209; 62/333

[56] References Cited

U.S. PATENT DOCUMENTS

| 796,283 | 8/1905 | Barber | 237/64 X |
|---|---|---|---|
| 2,068,549 | 1/1937 | Knight | 237/59 X |
| 2,195,293 | 3/1940 | Andersson | 62/333 X |
| 2,210,511 | 8/1940 | Taylor | 62/333 X |
| 2,210,607 | 8/1940 | Taylor | 62/333 X |
| 2,226,797 | 12/1940 | Andersson | 62/333 X |
| 3,390,672 | 7/1968 | Snelling | 126/271 |

FOREIGN PATENT DOCUMENTS

| 913,289 | 9/1946 | France | 137/151 |

*Primary Examiner*—Albert W. Davis, Jr.
*Attorney, Agent, or Firm*—Staas & Halsey

[57] ABSTRACT

The present invention relates to a heat transfer system particularly applicable to solar heating installations and consisting of an evaporator located near the heat source which may be a solar heat collector panel and a condenser that is located at an elevation lower than that of the evaporator and which may function to heat hot water for storage. The source heat is transferred to a volatile fluid within the evaporator that absorbs the heat with an increase in temperaure and a change of state from liquid to vapor. The vapor is conveyed to the condenser wherein the fluid liberates its latent heat while changing from vapor to liquid phase. The condensed liquid drains from the condenser to a trap which may be used, if desired, to regulate the flow of liquid through a check valve and further piping to a transfer tank located above the evaporator. The fluid in the transfer tank is maintained at a lower temperature than that of the evaporator as a result of being insulated from the heat source. A dual level control system is employed within the trasfer tank such that as the level of liquid therein rises above an upper limit the drain valve is opened permitting transfer of liquid to the evaporator. When the liquid level drops below the lower limit the drain valve is closed, at which time the cycle begins anew. The system is hermetically closed containing only the liquid and vapor of the selected volatile fluid.

15 Claims, 3 Drawing Figures

HEAT TRANSFER SYSTEM PARTICULARLY APPLICABLE TO SOLAR HEATING INSTALLATIONS

BACKGROUND OF THE INVENTION

Whereas no problems are usually experienced in transferring heat from a collector (or source) that is located below the sink (or storage facility) with the use of conventional convection heat transfer techniques, considerable difficulty is experienced in properly transferring heat in systems where the collector is located at a higher elevation than the sink. In solar energy collection systems, for example, the collector is of necessity positioned above the sink requiring the use of external power and control systems to transfer heat from the higher to the lower elevation.

The present invention relates to a system capable of transferring heat automatically from a heat source of relatively high temperature to a heat sink of lower temperature and at an elevation below that of its source without the necessity of using an external source of energy. Although the present invention is not limited in its application to solar energy collection systems, it is readily apparent that with the emphasis presently being placed on the utilization of solar energy as both primary and auxiliary sources of heat, the transfer system of the invention disclosed herein constitutes an advancement of considerable importance in the art. Moreover, and with particular reference to the solar application, it should be noted that with the present invention it is possible to automatically operate as a heat trap while minimizing the transfer of heat in the reverse direction should the heat source become colder then the sink, as would occur at night in a solar heating system.

The foregoing advantages are accomplished in the present invention with the use of an evaporator that is located near the heat source, which may comprise a solar heat collector panel, for example, and a condenser that is located at an elevation lower than that of the evaporator and which may function to heat hot water for storage, for example. The source heat is transferred to a volatile fluid that absorbs the heat with an increase in temperature and a change of state from liquid to vapor. The vapor that has been thus generated is conveyed by appropriate piping to the condenser wherein the fluid liberates its latent heat while changing from vapor to liquid phase. The so-condensed liquid then drains from the condenser to a trap which regulates the flow of liquid through a check valve and further piping to a transfer tank that is located above the evaporator. The fluid in the transfer tank is maintained at a lower temperature than that of the evaporator as a result of being insulated from the heat source. A dual level control system, which may be float operated, is employed in the transfer tank such that as the level of liquid in the tank rises above the upper control level the drain valve is opened permitting the transfer of the liquid into the evaporator. When the level of liquid within the tank drops below the lower control level the drain valve is closed, permitting the cycle to begin anew as the transfer tank begins to refill. The check valve functions to prevent liquid from draining back into the condenser during the aforementioned cycle. It should also be noted that the heat transfer system of the present invention is hermetically closed in such manner as to contain only the liquid and vapor of the volatile fluid. Air and extraneour gases are thereby excluded.

DESCRIPTION OF THE PREFERRED EMBODIMENT

Figure 1:
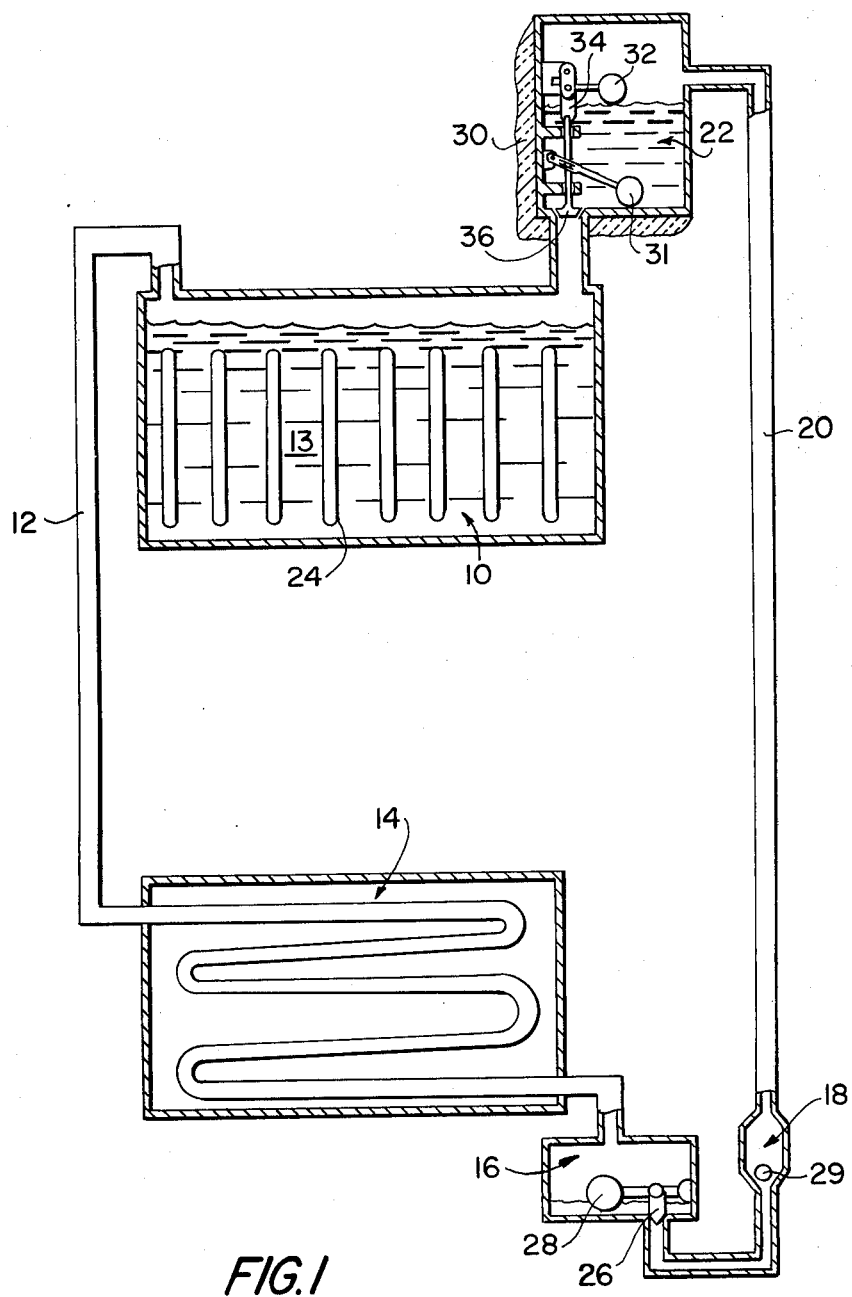
FIG. 1 is an elevational view of the heat transfer system of the present invention illustrating the evaporator, the vapor line, the condenser, the trap, the check valve, the liquid line, and the transfer tank which is provided with the dual level control system.

The heat transfer system of the present invention, as illustrated in FIG. 1, consists of an evaporator 10, a vapor line 12, a condenser 14, a trap 16, a check valve 18, a liquid line 20, and a transfer tank 22.

It will be apparent from FIG. 1 that the evaporator 10 is positioned in heat transfer relationship with a source of heat, designated generally by the reference numeral 24, and contains both liquid and vapor phases of a volatile fluid 13, it being apparent that the vapor phase of the fluid is located near the top of the evaporator 10.

With respect to the volatile or vaporizable heat transfer fluids referred to herein, it will be apparent that the selection of the most desirable fluid for use in a particular installation will be governed by such variables as temperature ranges and differences in height. With respect to these requirements, the primary properties of the volatile fluid include vapor pressure, latent heat of vaporization and specific heat, while the secondary properties include liquid and vapor densities, conductivity, viscosity, chemical stability and toxicity. With the foregoing criteria in mind it will be apparent that the following fluids will be appropriate for many temperatures and differences in height: Freons such as Nos. 11, 12, 113 and 114, ethyl alcohol, ethyl ether, methyl chloride and carbon tetrachloride. There is no particular fluid that will be most appropriate for all applications. A few applications of the foregoing criteria will be helpful. Where designing for a 20 foot difference in elevation, a difference in vapor pressure between the evaporator and transfer trank of approximately 20 pounds per square inch is necessary. For a design condition of 120° F in the evaporator and 100° F in the transfer tank, a vapor pressure of at least 70 pounds per square inch at 100° F is necessary. The aforementioned design conditions would effectively eliminate low pressure fluids such as Freon 11 and 113. It will also be apparent that if it were considered desirable to limit the maximum vapor pressure to 500 pounds per square inch at 200° F for safety reasons, Freon 22 and 502 would not be used.

As heat from the source 24 is transferred to the volatile fluid 13 within the evaporator 10, the fluid 13 absorbs the heat with an increase in temperature, and eventually a change of state from liquid to vapor occurs. It is understood, of course, that the pressure in the evaporator 10 is determined by the vapor pressure of the particular volatile liquid 13 at the liquid temperature in the evaporator 10.

The vapor that is so-generated is conveyed downwardly from the evaporator 10 to the condenser 14 along the vapor line 12. It is noted that the condenser 14 is located near the heat sink, and as heat is transferred from the fluid a change of state occurs from vapor to liquid during which time latent heat is liberated. Thereafter, the condensed liquid drains from the condenser 14 into the trap 16 which, as explained hereinafter, is optional, and which if used regulates the flow of liquid through the check valve 18 and the liquid line 20 to the transfer tank 22. It is apparent that the trap 16, if used, functions to collect the so-condensed liquid and to permit only such liquid to leave. Where there is sufficient fluid friction in the system for stable operation, the trap 16 is not necessary. The check valve 18 prevents flow in the reverse direction.

Although the construction and operation of traps and check valves are well known to persons skilled in the art, it is noted that the trap 16, as schematically illustrated in FIG. 1, includes a plunger 26 which is raised and lowered to permit and terminate, respectively, flow therethrough by the interaction between the liquid level and the flotation ball 28. Thus, upon reaching a predetermined low level flow through the trap 16 is terminated. As illustrated schematically in FIG. 1, the check valve 18 utilizes a ball 29 which seats against the shoulder of the housing preventing reverse flow.

The transfer tank 22 is located above the evaporator 10 and is maintained at a temperature lower than the evaporator 10 by the insulation 30. The pressure in the transfer tank 22 is the vapor pressure of the volatile liquid at the temperature within the transfer tank 22. This pressure must be sufficiently less than the pressure in the evaporator 10 to maintain circulation of the fluid 13 which requires overcoming all friction losses as well as the pressure differential of the liquid head in the liquid pipe 20.

Figure 2:
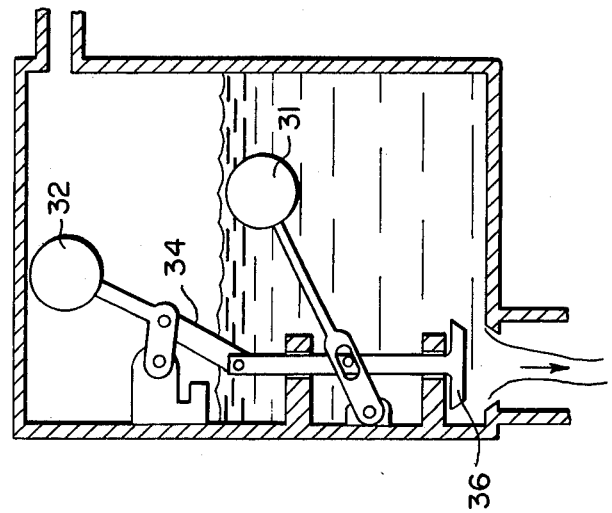
FIG. 2 is a cross-sectional view of the dual level control system within the transfer tank illustrating the position of the component parts when in the draining mode of operation.

The transfer tank 22 is provided with a dual level control system consisting of a lift float 31, a trigger float 32, linkage 34 and plunger 36 such that as the level of the liquid in the transfer tank 22 exceeds the upper control level (defined by the trigger float 22) the plunger 36 is raised permitting liquid from the tank 22 to drain after pressure equalization downwardly into the evaporator. The draining mode as illustrated in FIG. 2. Alternatively, as the level within the tank 22 decreases below the lower control level (defined by the lift float 31) the plunger 36 is lowered terminating flow from the transfer tank 22, at which time the tank 22 begins to refill with liquid. The filling mode is illustrated in FIG. 1. It is apparent that during the drain cycle the check valve 18 prevents liquid in the line 20 from draining back into the condenser 14.

It should be noted that the linkage 34 comprises a toggle system of straight line configuration thus permitting the withstanding of large forces.

It should be further emphasized that the heat transfer system, as described above, is hermetically closed containing only the liquid and vapor phases of the volatile fluid. All air and extraneous gases are thereby excluded.

From the foregoing, it is apparent that although the evaporator 10 and the source of heat 24 are located above (in terms of gravity) the heat sink and the condenser 14, the efficient transfer of heat is possible without the use of external power and control systems.

Figure 3:
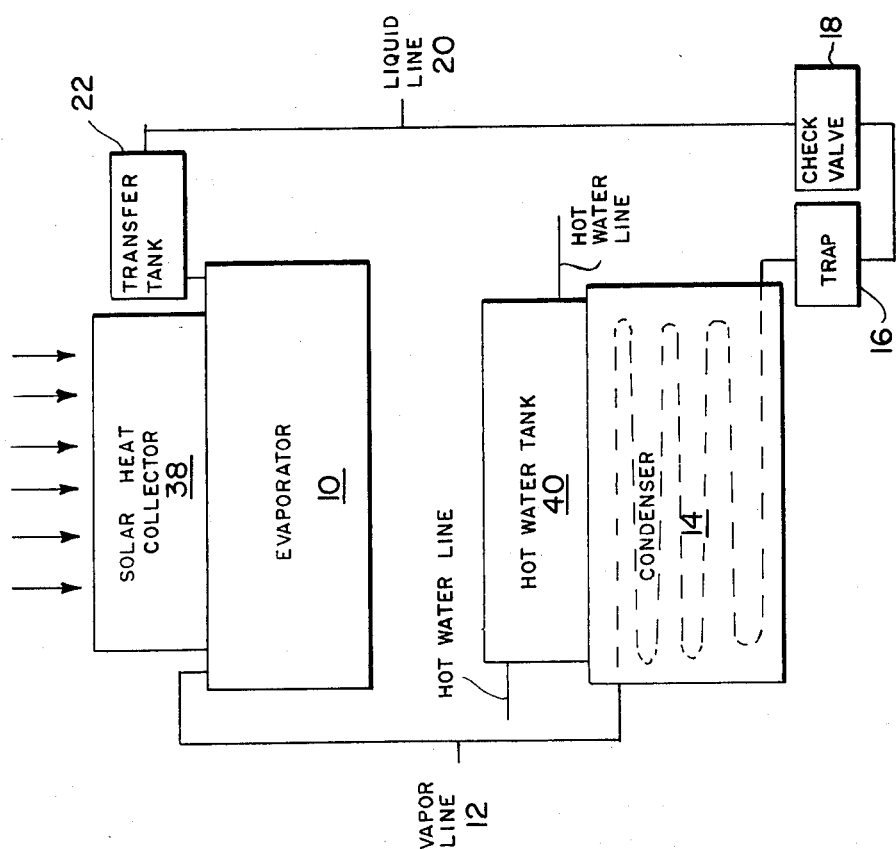
FIG. 3 is a schematic block diagram illustrating application of the heat transfer principles of the present invention to the collection and storage of solar energy, wherein it will be apparent that a solar heat collector is positioned in proximity to the evaporator to supply heat thereto and the condenser is oriented to heat water within a storage facility.

Turning to FIG. 3, it is noted that the reference numeral 38 schematically designates a solar heat collector, which for purposes of demonstrating application of the heat transfer system to solar heating may be of any design for supplying heat to the evaporator 10. Similarly, the condenser 14 is schematically illustrated as being adjacent a hot water tank or other storage facility 40. Thus, the heat transferred to the evaporator 10 is derived from solar energy via the collector 38, and the heat liberated from the condenser 14 is used to heat water stored for use in the tank 40.

It is significant to note that the vapor and liquid lines 12 and 20, respectively, may be of small cross-section thus permitting application of the present heat transfer system to solar collection and storage in existing structures without the necessity of substantial modification. Since the vapor and liquid lines are small, and since no external power and control systems such as pumps, valves and the like are required, connection of the solar heat collector and evaporator assemblies to the condenser and storage facilities may be accomplished simply by use of the vapor and liquid lines.

I claim:

1. A system for transferring heat from a source at high temperature to a sink at relatively lower temperature wherein the sink is located at an elevation below the source, comprising an evaporator in heat exchange relationship with said source, a condenser in heat exchange relationship with said sink, vapor conduit means connecting the top portion of said evaporator directly to said condenser, a check valve, conduit means connecting said check valve to said condenser, a liquid transfer tank positioned above said evaporator and provided with means for intermittently transferring the liquid accumulated in said transfer tank to said evaporator in response to the volume of the liquid in said transfer tank, liquid conduit means connecting said check valve to said transfer tank, and a volatile fluid within the system.

2. A system as in claim 1, wherein said source comprises a solar heat collector and said sink comprises a heat storage facility.

3. A system as in claim 1, including a trap in communication with said check valve.

4. A system as in claim 3, wherein said evaporator, condenser, trap, check valve, transfer tank and conduit means are hermetically closed containing only the liquid and vapor phases of said volatile fluid.

5. A system as in claim 3, wherein said liquid trap is interposed between said check valve and said condenser.

6. A system as in claim 1, wherein said means transferring the liquid accumulated in said transfer tank to said evaporator includes a single conduit connecting said transfer tank to said evaporator.

7. A system as in claim 6, wherein said means for intermittently transferring the liquid accumulated in said transfer tank to said evaporator further comprises flow operated dual level control valve means for opening communication from said transfer tank to said evaporator as the level of liquid within said transfer tank exceeds an upper control level and closing communication from said transfer tank to said evaporator as the level of liquid in said transfer tank drops below a lower level.

8. A system as in claim 1, further comprising insulating means maintaining said transfer tank at a temperature lower than said evaporator.

9. A system for transferring heat with the use of a volatile fluid from a source of high temperature to a sink at a relatively lower temperature, comprising an evaporator in heat exchange relationship with said source, a condenser in heat exchange relationship with said sink, a conduit for vapor directly connecting said evaporator and said condenser, a check valve, a conduit for liquid directly connecting said check value and said condenser, a liquid transfer tank, flow operated dual level control means for operatively connecting said transfer tank to said evaporator in response to liquid within said transfer tank exceeding an upper level and disconnecting the connection between said transfer tank and said evaporator as the level of liquid in said transfer tank drops below a lower level, and conduit means connecting said check valve to said transfer tank.

10. A system as in claim 9, wherein said means for connecting said transfer tank to said evaporator further comprises a single conduit.

11. A system as in claim 10, wherein said evaporator, condenser, flow operated dual level control means, check valve, transfer tank and conduit means are hermetically closed.

12. A system as in claim 11, further comprising trap means in communication with said check valve.

13. A system as in claim 9, further comprising insulating means maintaining said transfer tank at a temperature lower than said evaporator.

14. A system as in claim 9, wherein said vapor conduit means comprises a single conduit directly connecting the top portion of said evaporator to said condenser.

15. A system as in claim 14, wherein said liquid conduit means comprises a single conduit directly connecting said check valve to said transfer tank.

* * * * *